US009865172B2

(12) United States Patent
Takahashi et al.

(10) Patent No.: US 9,865,172 B2
(45) Date of Patent: Jan. 9, 2018

(54) INFORMATION PROCESSING DEVICE, INFORMATION PROCESSING METHOD, PROGRAM, AND IMAGING SYSTEM

(71) Applicant: Sony Corporation, Tokyo (JP)

(72) Inventors: Masahiro Takahashi, Kanagawa (JP); Satoshi Akagawa, Tokyo (JP); Kae Okazawa, Kanagawa (JP); Yoshinori Yamada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/122,608

(22) PCT Filed: Mar. 4, 2015

(86) PCT No.: PCT/JP2015/056316
§ 371 (c)(1),
(2) Date: Aug. 30, 2016

(87) PCT Pub. No.: WO2015/163012
PCT Pub. Date: Oct. 29, 2015

(65) Prior Publication Data
US 2017/0076612 A1 Mar. 16, 2017

(30) Foreign Application Priority Data
Apr. 25, 2014 (JP) .................. 2014-091358

(51) Int. Cl.
G08G 5/00 (2006.01)
G05D 1/00 (2006.01)
(Continued)

(52) U.S. Cl.
CPC ......... G08G 5/0034 (2013.01); B64C 39/024 (2013.01); B64D 47/08 (2013.01);
(Continued)

(58) Field of Classification Search
CPC ....... B64C 13/20; B64C 39/02; B64C 39/024; B64D 47/08; G05D 1/00; G05D 1/0038; G05D 1/0044; G08G 5/0034; H04N 7/18
(Continued)

(56) References Cited

U.S. PATENT DOCUMENTS 6,856,894 B1 * 2/2005 Bodin .................. G05D 1/0044
244/75.1
7,940,259 B2 * 5/2011 Wright .................. G01C 23/00
345/418
(Continued)

FOREIGN PATENT DOCUMENTS

CA 2821305 A1 * 1/2014 ........... G08G 5/0021
EP 2 136 276 A2 12/2009
(Continued)

OTHER PUBLICATIONS

Office Action dated Oct. 27, 2017, in Europe Patent Application No. 15782406.1-1803/3136195 PCT/JP2015056316.

Primary Examiner — Tyler J Lee
(74) Attorney, Agent, or Firm — Oblon, McClelland, Maier & Neustadt, L.L.P.

(57) ABSTRACT

[Object] To provide an information processing device for enabling a user to easily carry out effective photography depending on a subject or location.
[Solution] Provided is an information processing device including: a flight route generation unit that presents a template of flight route information showing a flight route of a flying object, and generates flight route information of the flying object, associating the flight route information of the selected template with a flight range of the flying object, on the basis of an operation performed by a user.

33 Claims, 11 Drawing Sheets

(51) Int. Cl.
*B64C 39/02* (2006.01)
*B64D 47/08* (2006.01)
*G06K 9/00* (2006.01)
*H04B 7/185* (2006.01)

(52) U.S. Cl.
CPC ......... *G05D 1/0016* (2013.01); *G05D 1/0038* (2013.01); *G05D 1/0044* (2013.01); *G05D 1/0094* (2013.01); *G06K 9/0063* (2013.01); *G08G 5/0013* (2013.01); *G08G 5/0069* (2013.01); *G08G 5/0086* (2013.01); *H04B 7/185* (2013.01); *B64C 2201/123* (2013.01); *B64C 2201/127* (2013.01)

(58) Field of Classification Search
USPC ......................................................... 701/2, 3
See application file for complete search history.

(56) References Cited

U.S. PATENT DOCUMENTS

| | | | |
|---|---|---|---|
| 8,285,425 B2 * | 10/2012 | Morales De La Rica | G05D 1/101 244/152 |
| 2007/0018052 A1 * | 1/2007 | Eriksson | G05D 1/0044 244/190 |
| 2007/0129855 A1 * | 6/2007 | Coulmeau | G08G 5/0039 701/3 |
| 2009/0105943 A1 | 4/2009 | Ferro et al. | |
| 2010/0084513 A1 | 4/2010 | Gariepy et al. | |
| 2010/0286859 A1 * | 11/2010 | Feigh | G05D 1/0044 701/25 |
| 2011/0257813 A1 * | 10/2011 | Coulmeau | G08G 5/0013 701/2 |
| 2012/0143482 A1 * | 6/2012 | Goossen | G08G 5/0069 701/120 |
| 2012/0280087 A1 * | 11/2012 | Coffman | G05D 1/0044 244/175 |
| 2014/0018979 A1 * | 1/2014 | Goossen | G08G 5/0034 701/3 |
| 2014/0316616 A1 * | 10/2014 | Kugelmass | G05D 1/101 701/8 |

FOREIGN PATENT DOCUMENTS

| | | |
|---|---|---|
| EP | 2 244 150 A2 | 10/2010 |
| EP | 2 679 959 A2 | 1/2014 |
| EP | 2 711 913 A2 | 3/2014 |
| JP | 2001-306143 A | 11/2001 |
| JP | 2002-211494 A | 7/2002 |
| JP | 2006-027448 A | 2/2006 |
| WO | WO 2013/163746 A1 | 11/2013 |

* cited by examiner

INFORMATION PROCESSING DEVICE, INFORMATION PROCESSING METHOD, PROGRAM, AND IMAGING SYSTEM

TECHNICAL FIELD

The present disclosure relates to an information processing device, an information processing method, a program, and an imaging system for setting a flight route for a flying object.

BACKGROUND ART

Such a technology of an imaging method of a photo is disclosed that a camera is attached to a wireless-operable flying object and imaging is carried out with the camera (e.g., Patent Literature 1). By attaching the camera to the flying object, it is possible to image a photo aerially or from a place where a tripod does not stand. Further, as a result of the imaging by attaching the camera to the flying object, various advantages are obtained, e.g., costs can be suppressed, the imaging can be safely performed, the imaging can be performed even low in the air or in narrow space, and the imaging can be performed in vicinity to a target, as compared with a case of using a real airplane or a helicopter.

CITATION LIST

Patent Literature

Patent Literature 1: JP 2006-27448A

SUMMARY OF INVENTION

Technical Problem

The flying object having such an imaging device has been formerly used for army many times. In addition, the number of the flying objects for consumer is recently increased. However, a large number of the flying objects for consumer are not sufficient for a solution for photography.

For example, a technique to control a flying object requires a high technology, and is not specialized for photography. A user needs to perform both a flying operation of the flying object and a photographing operation with a camera, and the level of difficulty for the operation is therefore high for a general camera user. It is difficult to carry out effective photography depending on a subject or location.

The present disclosure proposes a novel and improved information processing device, information processing method, program, and imaging system for enabling a user to easily carry out effective photography depending on a subject or location.

Solution to Problem

According to the present disclosure, there is provided an information processing device including: a flight route generation unit that presents a template of flight route information showing a flight route of a flying object, and generates flight route information of the flying object, associating the flight route information of the selected template with a flight range of the flying object, on the basis of an operation performed by a user.

According to the present disclosure, there is provided an information processing method including: presenting a template of flight route information showing a flight route of a flying object; and generating flight route information of the flying object, associating the flight route information of the selected template with a flight range of the flying object, on the basis of an operation performed by a user.

According to the present disclosure, there is provided a program for causing a computer to execute processing including: presenting a template of flight route information showing a flight route of a flying object; and generating flight route information of the flying object, associating the flight route information of the selected template with a flight range of the flying object, on the basis of an operation performed by a user.

According to the present disclosure, there is provided an imaging system including: a flying object; and an information processing terminal including a flight route generation unit that presents a template of flight route information showing a flight route of the flying object, and generates flight route information of the flying object, associating the flight route information of the selected template with a flight range of the flying object, on the basis of an operation performed by a user.

According to the present disclosure, a template of flight route information showing a flight route for a flying object is presented to a user, and final flight route information of the flying object is generated on the basis of operations performed by a user on the template. The user selects the template and performs an operation, thereby easily generating the flight route information of the flying object.

Advantageous Effects of Invention

As mentioned above, according to the present disclosure, the flight route information of the flying object can be easily prepared. Therefore, the user can easily carry out effective photography depending on the subject or location. Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that, a description is given in the following order.
1. First Embodiment (automatic preparation using template)
  1.1. Outline of imaging system using flying object
  1.2. Functional configuration
  1.3. Flight route information generating processing
2. Second Embodiment (manual preparation using partial template)
  2.1. Flight route information generating processing
3. Conclusion
4. Exemplary hardware configuration

1. FIRST EMBODIMENT

[1.1. Outline of Imaging System Using Flying Object]

Figure 1:
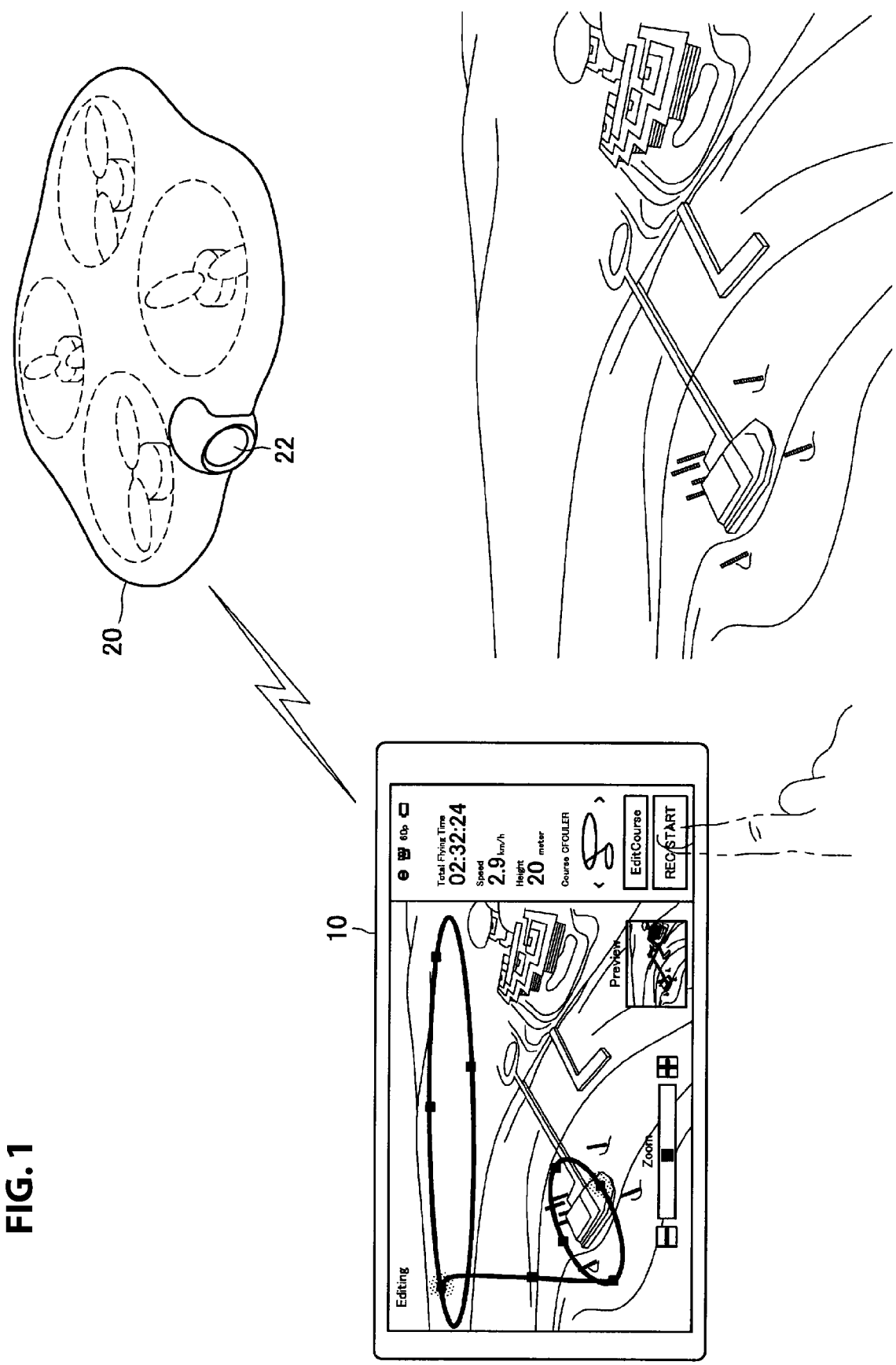
FIG. 1 is an explanatory diagram explaining an outline of an imaging system according to a first embodiment of the present disclosure.

First, a description is given of an outline of an imaging system according to a first embodiment of the present disclosure with reference to FIG. 1. Note that, FIG. 1 is an explanatory diagram explaining the outline of the imaging system according to the present embodiment.

As shown in FIG. 1, the imaging system according to the present embodiment includes an information processing terminal 10 and a flying device (flying object) 20 that are configured to be able to communicate with each other. The information processing terminal 10 is a device such as a smartphone or a tablet terminal, for example, and is used as a device for preparing flight route information of the flying device 20 in the imaging system according to the present embodiment. The information processing terminal 10 has a communication function, thereby sending the prepared flight route information to the flying device 20.

On the other hand, the flying device 20 is a device that flies based on the flight route information. The flying device 20 according to the present embodiment has an imaging device 22. The flying device 20 flies based on the flight route information and simultaneously carries out photography with the imaging device 22 based on a camera angle and flaming set together with the flight route information.

With the imaging system according to the present embodiment, the flying device 20 flies and carries out photography based on the flight route information prepared by the information processing terminal 10. The flight route information of the flying device 20 is selected and set from the templates of the flight route presented to a user via the information processing terminal 10. The template of the flight route includes setting of the imaging device 22 at a photographing time. Therefore, the user selects the template for a subject, thereby automatically generating the flight route information including flight control information for flying the flying device 20 along the flight route and photographing control information of the imaging device 22.

Hereinafter, a specific description will be given of a configuration of the imaging system and generating processing of the flight route information of the flying device 20 according to the present embodiment.

[1.2. Functional Configuration]

Figure 2:
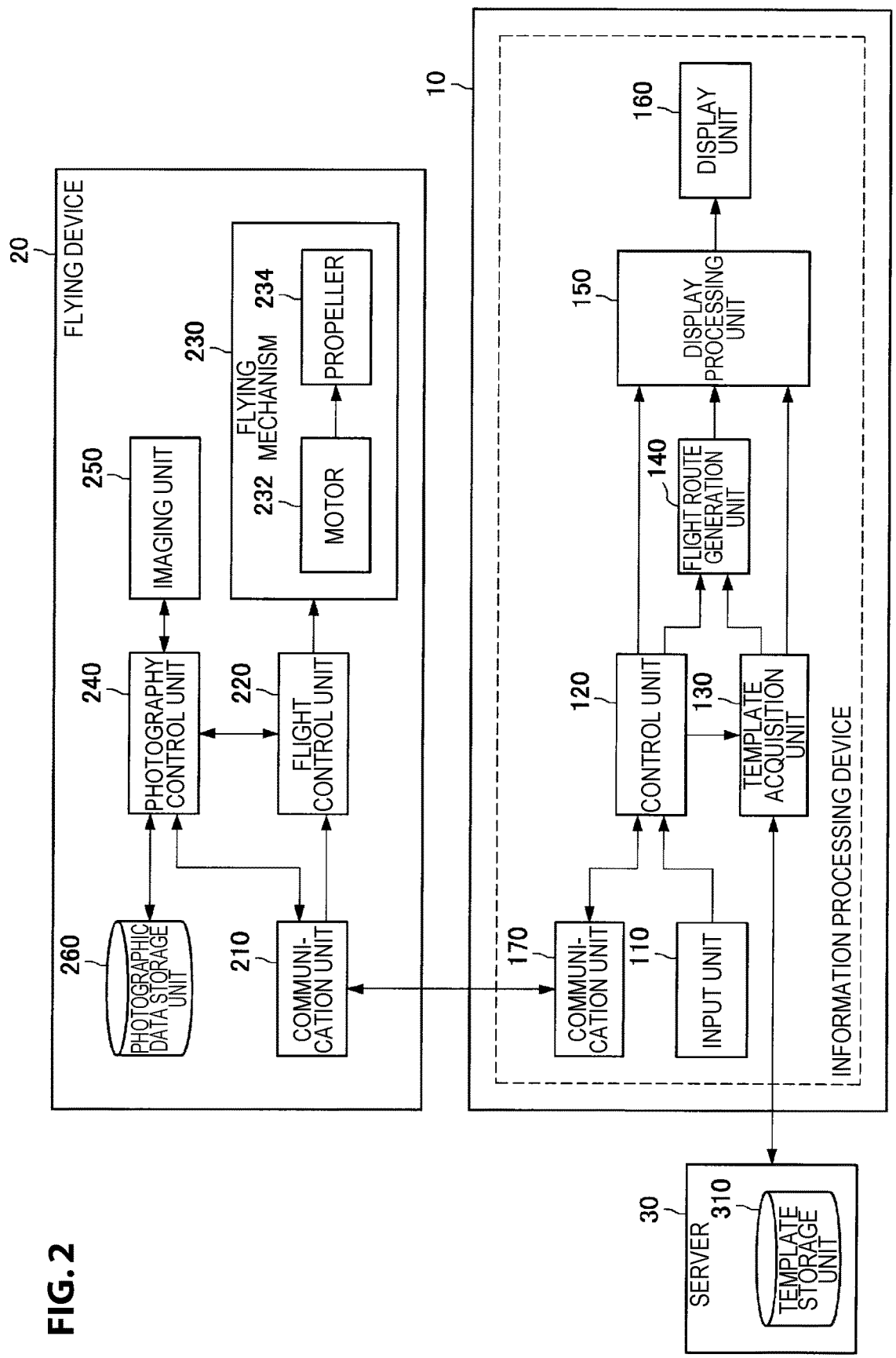
FIG. 2 is a functional block diagram illustrating a functional configuration of an information processing terminal and a flying device forming the imaging system according to the embodiment.

FIG. 2 illustrates a functional configuration of the information processing terminal 10 and the flying device 20 forming the imaging system according to the present embodiment.

(Information Processing Terminal)

As shown in FIG. 2, the information processing terminal 10 includes an input unit 110, a control unit 120, a template acquiring unit 130, a flight route generation unit 140, a display processing unit 150, a display unit 160, and a communication unit 170.

The input unit 110 is a functional unit that receives an operation of the information processing terminal 10 from a user. The input unit 110 is, for example, a touch panel provided so as to overlap the display unit 160, a button arranged on a casing of the information processing terminal 10, or the like. The input unit 110, upon receiving an operation input from the user, outputs input information to the control unit 120.

The control unit 120 controls various functional units included in the information processing terminal 10 based on the input information from the input unit 110. For example, the control unit 120, upon receiving a preparation request of the flight route information as the input information, instructs the display processing unit 160 to display a photographic scene selecting screen (FIG. 4) for setting the flight route information on the display unit 170. The control unit 120, upon receiving selecting information of the photographic scene as the input information, instructs the template acquiring unit 130 to acquire a template to which the flight route information suitable to the selected photographic scene is preset. Alternatively, the control unit 120, upon receiving change information for changing the flight route information of the selected template as the input information, instructs the flight route generation unit 140 to correct the flight route information. Further, the control unit 120 also controls communication with the flying device 20.

The template acquiring unit 130 acquires the template of the flight route information of the flying device 20 preset from the server 30 based on the instruction of the control unit 120, and is communicably connected with the server 30 via a network. The server 30 includes a template storage unit 310 that stores the template of the preset flight route information. Note that, the template stored in the template storage unit 310 may be updated at a predetermined timing. The template acquiring unit 130 sends the photographic scene selected by the user together with a template sender request to the server 30, and receives the template suitable to the selected photographic scene from the server 30. The acquired template is output to at least any one of the flight route generation unit 140 and the display processing unit 150.

The flight route generation unit 140 generates the flight route information based on the template selected by the user. When the user selects the template, the flight route generation unit 140 sets the selected template on subject information including a subject to be photographed by an imaging unit 260 in the flying device 20. The flight route generation unit 140, upon receiving the change information of the flight route information, corrects the flight route information. Note that, a specific description will be given of the function of the flight route generation unit 140 later. The flight route generation unit 140 outputs the generated flight route information to the display processing unit 150.

The display processing unit 150 performs processing for allowing the display unit 160 to display various kinds of information. For example, the display processing unit 150 allows the display unit 160 to display the template acquired by the template acquiring unit 130, the flight route information generated by the flight route generation unit 140, and the like.

The display unit 160 displays various kinds of information that are subjected to display processing by the display processing unit 150. The display unit 160 is, for example, a liquid crystal display device, an organic EL display device, or the like. When a touch panel is provided as the input unit 110 at the display unit 160, the user may directly operate information displayed on the display unit 160 by touching a surface of the display unit 160 with the finger or the like.

The communication unit 170 is a functional unit that receives and sends information from/to the flying device 20. For example, the communication unit 170 may be a wireless communication device such as Bluetooth (registered trademark) or a wireless local area network (LAN), alternatively, a wired communication device that performs wired communication. The communication unit 170 receives a sending instruction from the control unit 120, sends information to the flying device 20, and outputs the information received from the flying device 20 to the control unit 120.

(Flying Device)

On the other hand, as shown in FIG. 2, the flying device 20 includes a communication unit 210, a flight control unit 220, a flying mechanism, 230, a photography control unit 240, an imaging unit 250, and a photographic data storage unit 260.

The communication unit 210 is a functional unit that receives and sends information from/to the information processing terminal 10. The communication unit 210 is a wireless communication device such as Bluetooth (registered trademark) or wireless LAN or a wired communication device that performs wired communication, for example, similarly to the communication device 170 in the information communication terminal 10. The communication unit 210 outputs the information received from the information communication terminal 10 to the flight control unit 220 and the photography control unit 240, and sends the information to the information communication terminal 10 upon receiving a sending instruction from the photography control unit 240.

The flight control unit 220 performs flight control that allows the flying device 20 to fly along the set flight route based on the flight route information. The flight control unit 220 drives the flying mechanism 230 to fly the flying device 20 based on the flight route information.

The flying mechanism 230 is a mechanism for flying the flying device 20, and rotates a propeller 234 with a motor 232 to generate lift force and fly the flying device 20. The flying mechanism 230 may include, for example, four propellers 234 and four motors 232 arranged to each of the propellers 234, respectively. The motors 232 are driven based on motor driving control information from the flight control unit 220, and rotate the propeller 234 with the rotary force, respectively.

The photography control unit 240 controls photography using the imaging unit 250 based on setting information (hereinafter, referred to as "photographing setting information") at a photographing time of the photographing unit 250 included in the flight route information. The photography control unit 240 instructs photography start or photography end with the imaging unit 250, for example, based on the photographing setting information, and sets a camera angle, framing, or the like. Further, the photography control unit 240 stores photographic data acquired by the imaging unit 250 to the photographic data storage unit 260, and sends the photographic data to the information processing terminal 10 via the communication unit 210.

The imaging unit 250 captures a still image or a moving image. For example, the imaging unit 250 includes a lens and an imaging element such as a charge coupled device (CCD) image sensor, a complementary metal oxide semiconductor (CMOS) image sensor, or the like. The imaging unit 250 executes capturing of a still image or a moving image based on photography control information from the photography control unit 240. The captured image may be recorded to the photographic data storage unit 260 as photographic data.

The photographic data storage unit 260 stores imaging data including the still image or moving image acquired by the imaging unit 250. The photographic data may be stored in the photographic data storage unit 260 in association with the flight route information when capturing the image. The photographic data stored in the photographic data storage unit 260 can be read, for example, by the information processing terminal 10 or another device after the flight. The imaging device 22 includes the photography control unit 240, the imaging unit 250, and the photographic data storage unit 260.

The functional configuration of the imaging system according to the present embodiment is described above. Note that, with the imaging system according to the present embodiment, the template of the flight route information is acquired from the external server 30. However, the present disclosure is not limited to the example. For example, the information processing terminal 10 may have a template storage unit that stores a template. In this case also, the template stored in the template storage unit can be updated, thereby expanding variation of the flight route information that can be presented to a user or presenting the flight route information more suitable to a photographic scene or subject.

[1.3. Flight Route Information Generating Processing]

Figure 3:
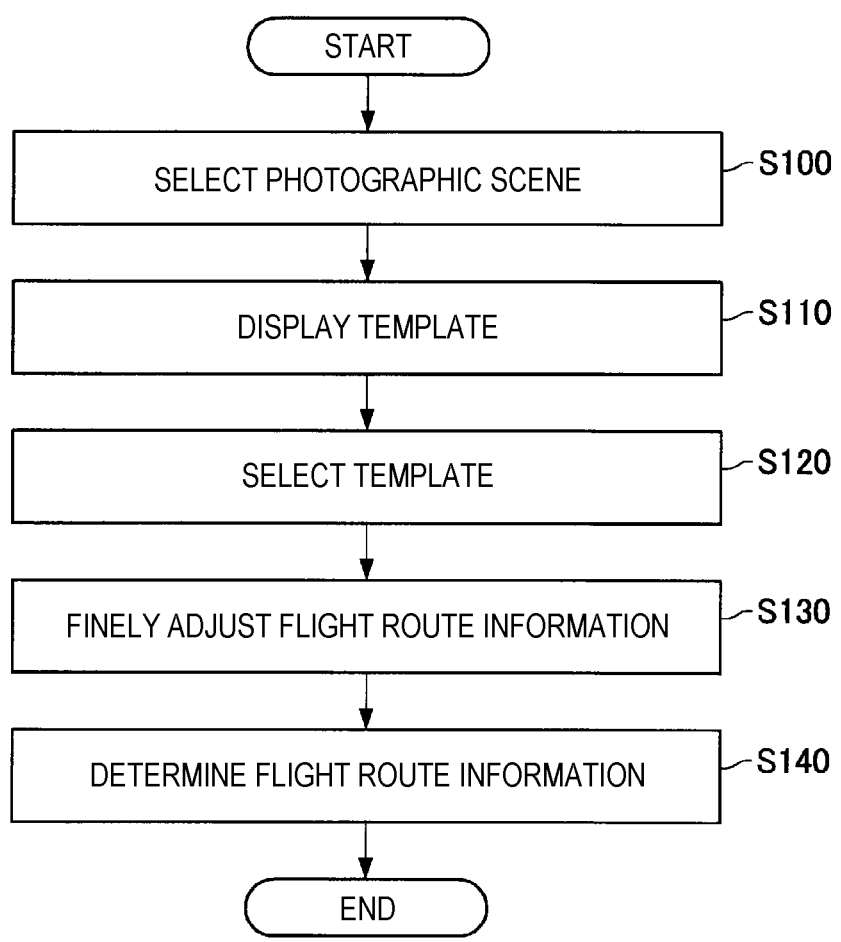
FIG. 3 is a flowchart showing flight route information generating processing according to the embodiment.
Figure 4:
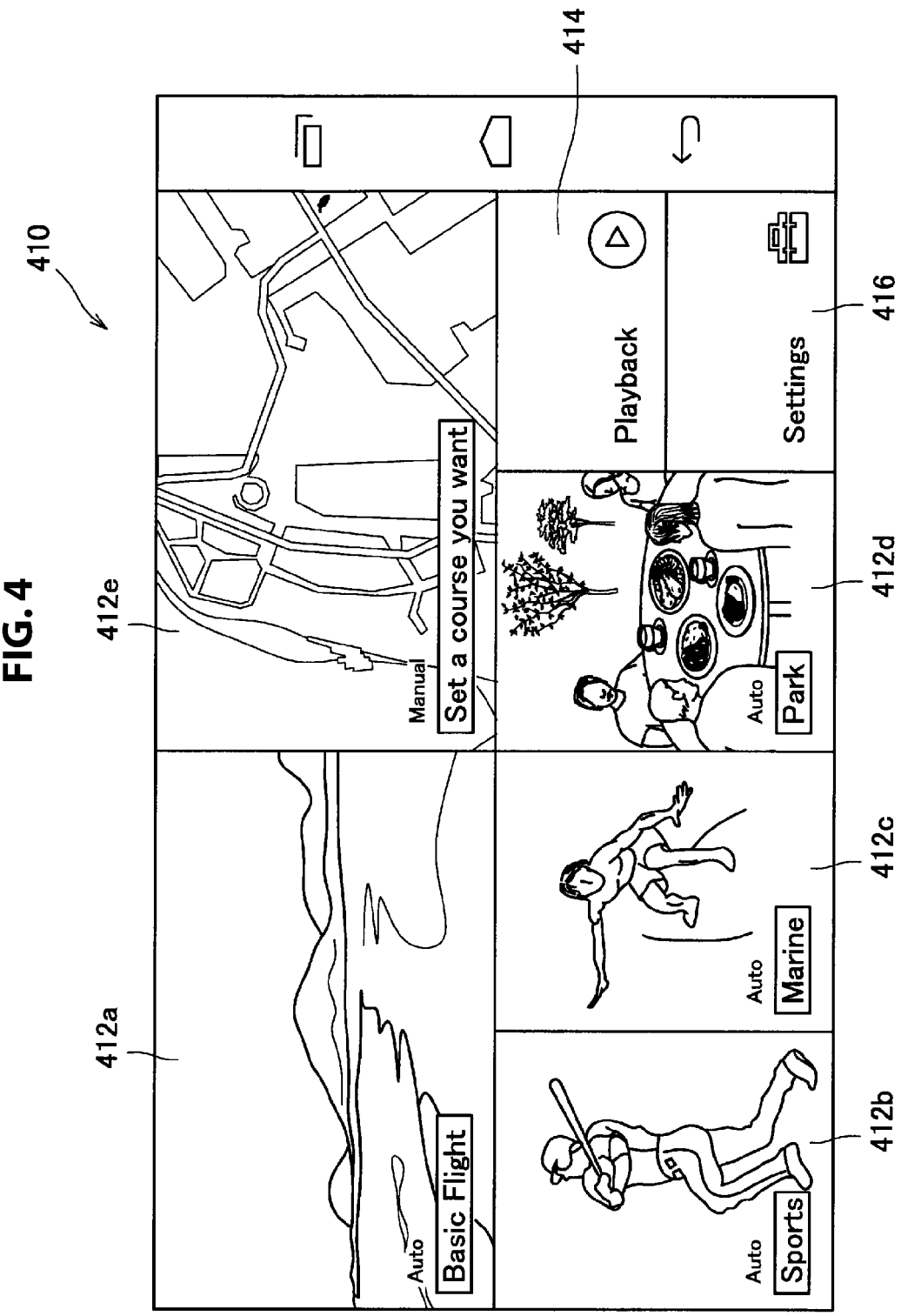
FIG. 4 is an explanatory diagram illustrating an example of a photographic scene selecting screen for selecting a photographic scene according to the embodiment.
Figure 5:
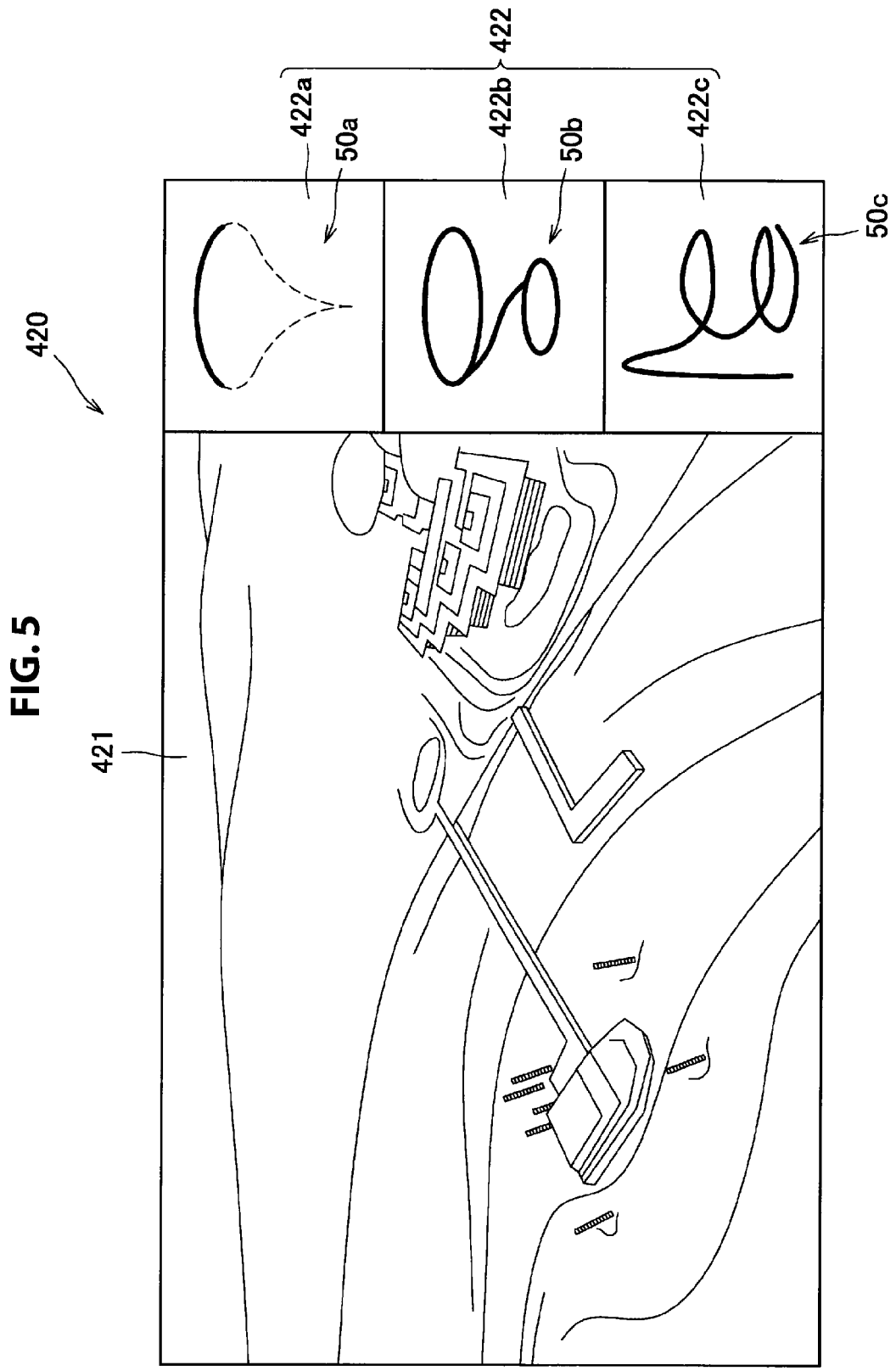
FIG. 5 is an explanatory diagram illustrating an example of a template selecting screen according to the embodiment.
Figure 6:
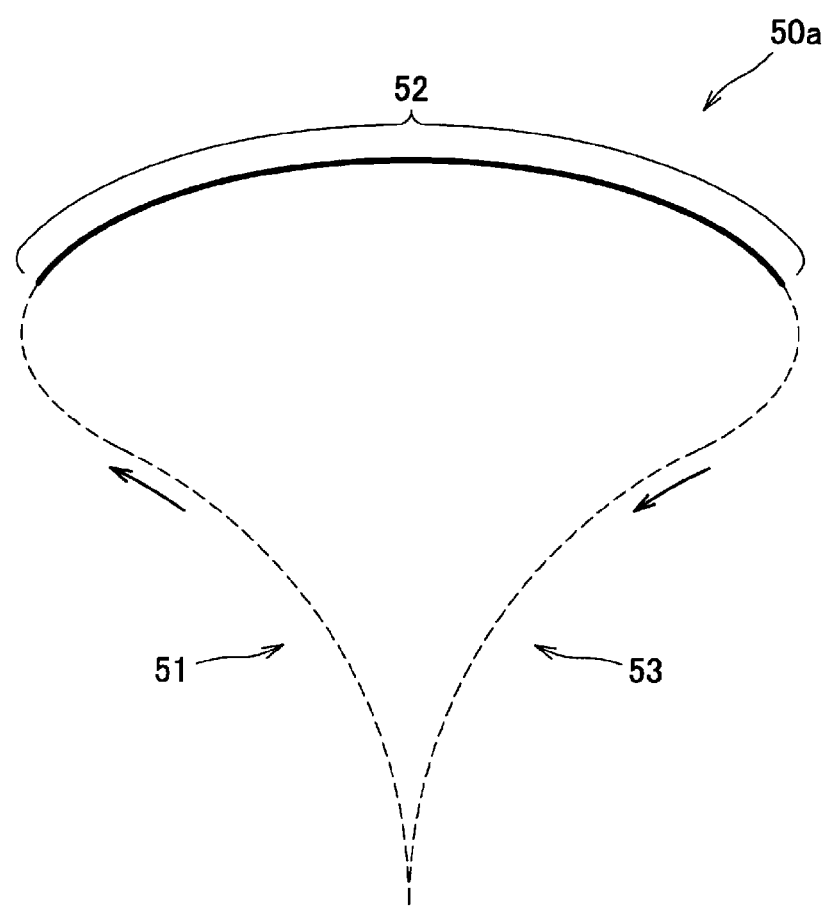
FIG. 6 is an explanatory diagram explaining flight route information represented by a template according to the embodiment.
Figure 7:
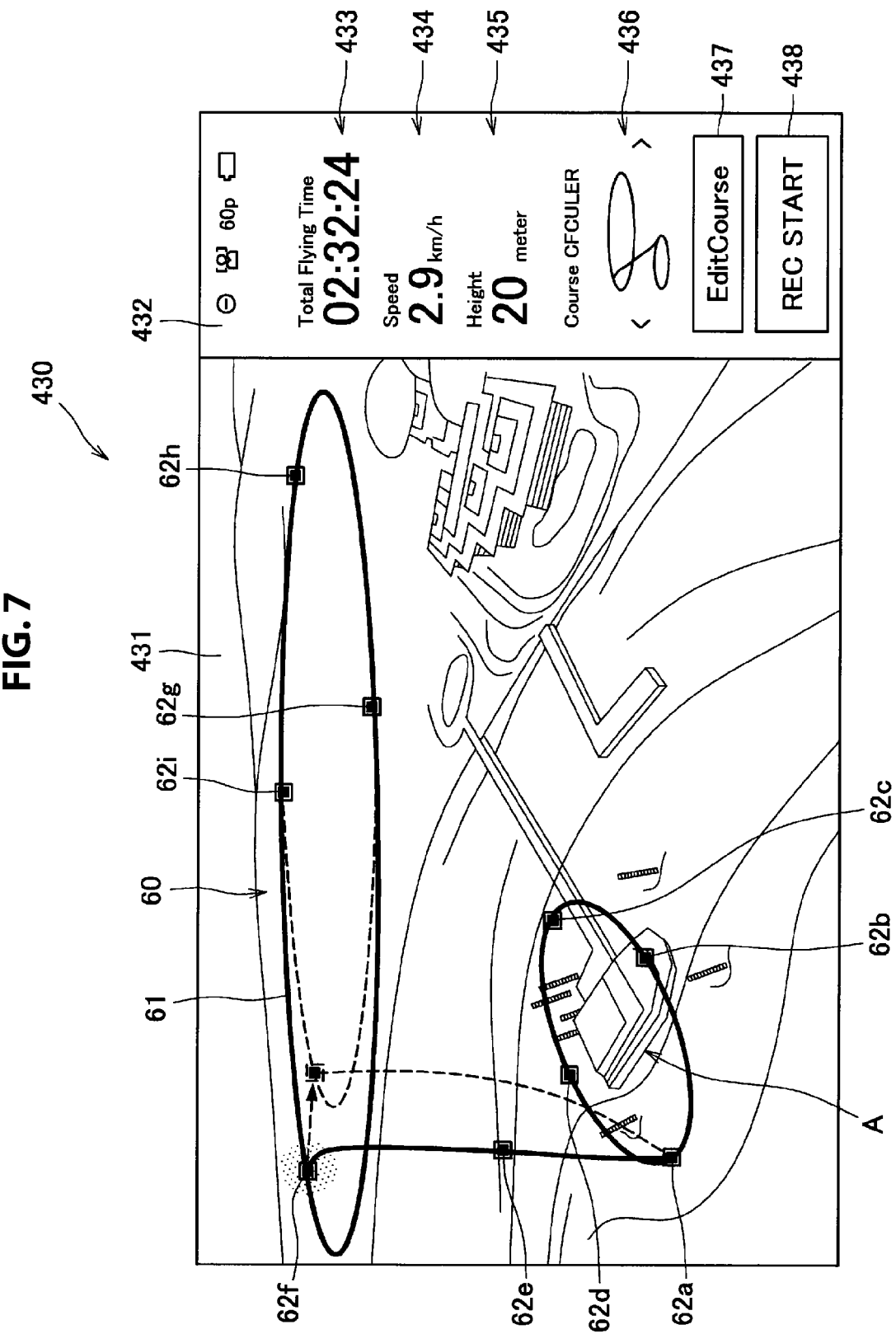
FIG. 7 is an explanatory diagram illustrating an example of a flight route information adjusting screen for adjusting flight route information according to the embodiment.
Figure 8:
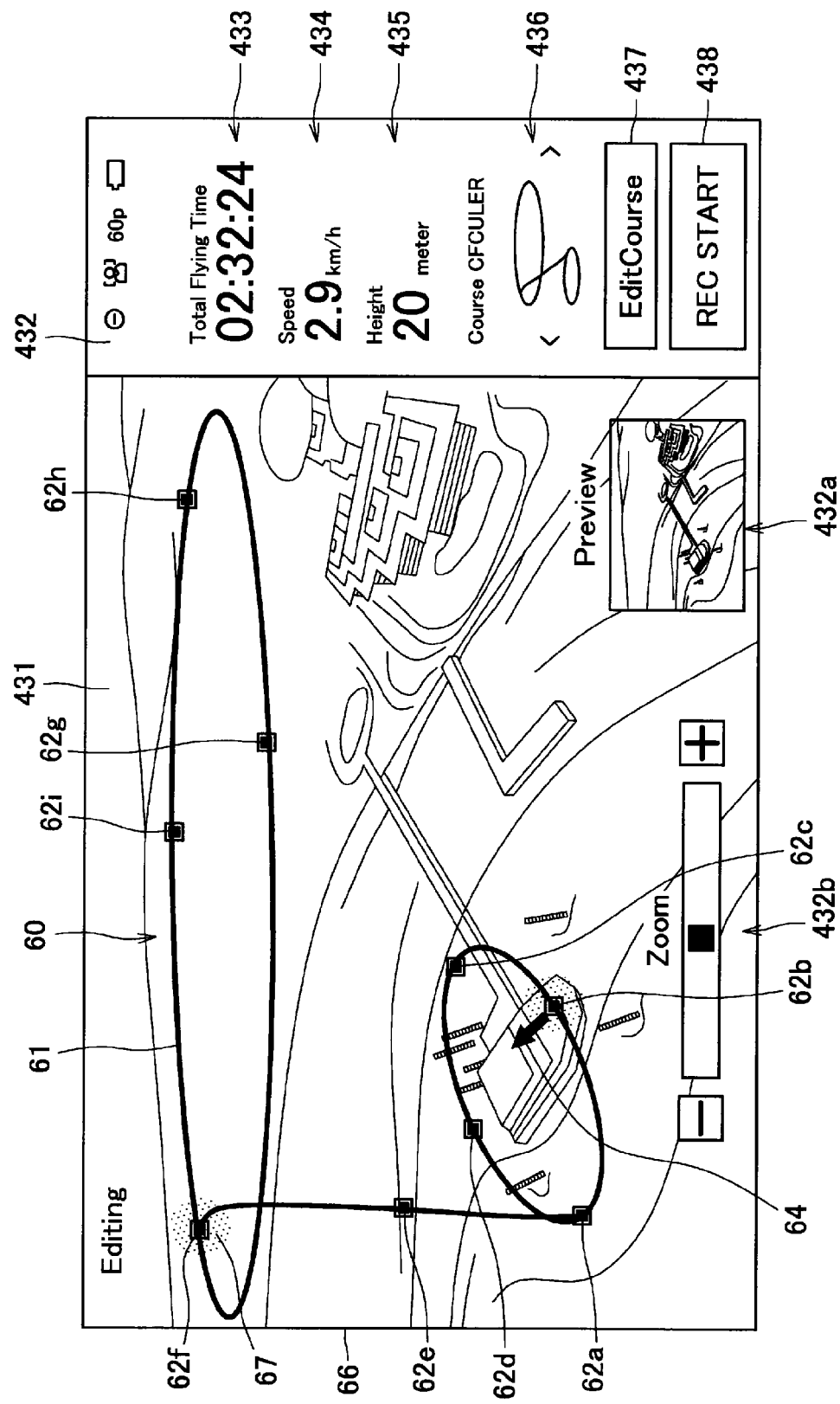
FIG. 8 is an explanatory diagram illustrating an example of a flight route information adjusting screen having a preview screen according to the embodiment.

Next, a description is given of flight route information generating processing according to the present embodiment with reference to FIG. 3 to FIG. 8. Note that, FIG. 3 is a flowchart showing the flight route information generating processing according to the present embodiment. FIG. 4 is an explanatory diagram illustrating an example of a photographic scene selecting screen 410 that selects a photographic scene. FIG. 5 is an explanatory diagram illustrating an example of a template selecting screen 420. FIG. 6 is an explanatory diagram explaining flight route information represented by a template. FIG. 7 is an explanatory diagram illustrating an example of a flight information adjusting screen 430 that adjusts the template. FIG. 8 is an explanatory diagram illustrating an example of the flight route information adjusting screen 430 having a preview screen 432b.

With the imaging system according to the present embodiment, a user sets the flight route information of the flying device 20 by using the information processing terminal 10. In this case, the information processing terminal 10 presents an optimal template depending on a scene or subject that the user desires to photograph with the imaging device 22 in the flying device 20, and sets the selected template depending on the subject, thereby generating the flight route information.

Thus, the user allows the flying device 20 to carry out aerial photography without flight control of the flying device 20 and photography control of the imaging device 22. Hereinafter, a specific description will be given of the flight route information generating processing.

(S100: Select Photographic Scene)

Upon receiving an instruction to prepare the flight route information from the user, the control unit 120 allows the display unit 160 to display the photographic scene selecting screen 410 for selecting the photographic scene for photography, and allows the user to select the photographic scene (S100).

FIG. 4 shows an example of the photographic scene selecting screen 410. The photographic scene selecting screen 410 presents, as photographic scenes, "Basic Flight" 412a for photographing a landscape, for example, "Sports" 412b for photographing sports events, "Marine" 412c for photographing beach or sea, and "Park" 412d for photographing at a park. As the photographic scene, in addition to the foregoing, a "snow" scene for photographing at a ski field, snow field, or the like, may be presented. For the photographic scenes, templates of the flight route information for photographing the scenes nicely are preset, respectively.

In the example in FIG. 4, when any of the photographic scene objects 412a to 412d, is selected, automatic setting is executed to automatically set the flight route information to the photographic scene. The user touches, with the finger or the like, a display area of the corresponding one of the photographic scene objects 412a to 412d displayed on the photographic scene selecting screen 410, for example, thereby selecting the photographic scene. When any one of the photographic scene objects 412a to 412d is selected, the screen shifts to the template selecting screen 420, and the template is displayed depending on the flight route information suitable to the selected photographic scene (S110).

Note that, in the present embodiment, a description is given of the flight route information setting processing for automatically setting the flight route information. However, the user can prepare the flight route information by oneself. In this case, the user selects a manual setting object 412e that enables manual setting of the flight route information, for example, on the photographic scene selecting screen 410 in FIG. 4. Processing at a manual setting time will be described later in details according to a second embodiment.

Further, as shown in FIG. 4, for example, the photographic scene selecting screen 410 may display a "Play-Back" object 414 for playing back the photographic data and a "Settings" object 416 for performing various settings related to the flight route information generating processing.

(S110: Display Template)

When the photographic scene is selected in step S100, the information processing terminal 10 displays the template of the flight route information corresponding to the selected photographic scene on the display unit 160 to present the template to the user (S110). When the photographic scene is selected, the control unit 120 in the information processing terminal 10 allows the template acquiring unit 130 to acquire the template of the flight route information suitable to the photographic scene from the server 30. The template acquiring unit 130 sends the photographic scene selected by the user together with a template sender request to the server 30.

Each of the templates stored in the template storage unit 310 in the server 30 includes a flight route of the flying device 20 as the flight route information and photographing setting information of the imaging device 22 in the flying device 20. For example, the template includes, as digital data, three-dimensional position information about a plurality of preset points where the flying device 20 is to fly and information showing movement order to the respective points. The template may contain information corresponding to a route where the flying device 20 is to fly, or may include movement path data represented by, for example, a vector component in place of the position information about a plurality of points.

The template of the flight route of the each photographic scene is designed by combining parts (also referred to as "partial templates") of the flight routes such as horizontal movement, rising, and circling to optimize the template to the scene or subject to be photographed. Specifically, the template is designed in consideration of a shape and width of a space to be photographed and a shape and position of the subject, and the like. For example, in case of photographing a building, the flying device 20 can be moved along a height direction of the building or can be circled around the building by setting the flight route having many up/down movements or circling operations. Further, if photographing a footrace in an athletic meet, for example, the flight route is set with many linear operations. Thus, the flying device 20 can be moved, following a movement of a person.

The template of the photographing setting information of each photographic scene is set in accordance with the flight route or a combination thereof. The photographing setting information includes, for example, photography start information for starting photography, photography end information for ending photography, camera mode setting for adjusting a camera angle, framing, and a frame rate at a photography time, and zoom setting, and the like. In the camera mode setting, it is possible to set high frame-rate photography indicating that a frame rate is high speed and low-speed photography indicating that the frame rate is low speed.

For example, regarding the camera angle, it is set such that the imaging direction of the imaging device 22 is in the advance direction of the flying device 20 or in the direction of the position where the subject exists when the flying device 20 is horizontally moved or vertically moved. Further, when the flying device 20 is circled, the imaging direction of the imaging device 22 is set to the direction of the rotational center of the flying device 20. Note that, processing such as white balance, brightness adjustment, and backlight correction may be automatically performed.

The each template stored in the template storage unit 310 in the server 30 stores the flight route information and the photographic scene information suitable to photography based on the flight route information, in association with each other. The server 30 extracts the template associated with the selected photographic scene from the template storage unit 310, and sends the template to the template acquiring unit 130 in the information processing terminal 10.

The template acquiring unit 130 outputs the template acquired from the server 30 to the display processing unit 150. The display processing unit 150 allows the display unit 160 to display the template selecting screen 420. FIG. 5 shows an example of the template selecting screen 420. Referring to FIG. 5, an example of the template selecting screen 420 is given when the "Basic Flight" 412a is selected on the photographic scene selecting screen 410 in FIG. 4.

The template selecting screen 420 contains a subject information display area 421 that displays subject information including the subject and a template display area 422 where the template of the flight route information acquired from the server 30 is displayed.

The subject information displayed in the subject information display area 421 is map information of a photographic range including the subject, and is acquired by specifying the photographic range including the subject, for example, with map application. The subject information is acquired before the template is selected. For example, before the photographic scene selecting processing in step S100, the subject information may be acquired. Here, the flying device 20 is moved in space. Therefore, by three-dimensionally displaying the map information as the subject information, it is easy for the user to imagine an image of movement of the flying device 20. As three-dimensional data (i.e., 3D map) of the map information, for example, data acquired in advance with three-dimensional laser scanning can be used.

Note that, the subject information can be a photographic range when photographing the subject with the imaging unit 250 according to the present embodiment. For example, when the flying device 200 simply flies, the subject information may be the flight range of the flying device 200. In this case, the map information within the flight range for flying the flying device 200 is the subject information.

The template display area 422 is provided to an end (e.g., right end) of the subject information display area 421, and template objects 50a, 50b, and 50c obtained by patterning the flight route information of the template are displayed therein. The template display area 422 in FIG. 5 displays three kinds of the template objects 50a, 50b, and 50c. The template display area 422 can display one or a plurality of template objects. When only a part of all the acquired templates are displayed in the template display area 422, a non-display template object may be displayed in the template display area 422, for example, with a scroll bar or a shift button.

The user selects the template used as the flight route information from the template objects 50a, 50b, and 50c displayed in the template display area 422. The template can be selected, for example, by dragging the selected template object 50a, 50b, or 50c to an arbitrary position in the subject information display area 421. Alternatively, the template can be selected by touching, with the finger or the like, the object area 422a, 422b, or 422c corresponding to the template object 50a, 50b, or 50c, respectively.

Herein, in the present embodiment, contents of the template presented to the user are presented as the template object 50a, 50b, or 50c acquired by patterning the flight route information in the template display area 422. For example, the respective template objects 50a, 50b, and 50c shown in FIG. 5 show the flight routes of the flying device 20 and how the flying device 20 is moved based on the shape of the template object. For example, the flight route of the template object 50a is moved aerially with substantially the same height, and the flight route of the template object 50b is circled, thereafter risen, and further aerially circled up along the flight route thereof. Further, the flight route of the template object 50c is vertically risen, and thereafter fallen with twists along the flight route thereof. As mentioned above, the user can easily recognize contents of the respective templates from the template objects 50a, 50b, and 50c.

The template object may further include the photographing setting information. For example, in the template object 50a shown in FIG. 6, movements of the flying device 20 are shown by broken lines 51 and 53 and a solid line 52. At intervals of the broken lines 51 and 53, it is shown that the photography with the imaging device 22 is not performed. At the interval of the solid line 52, it is shown that the photography with the imaging device 22 is performed. Obviously, with the template object 50a shown in FIG. 6, the imaging data is not acquired when the flying device 20 is risen or fallen, and the photographic data is acquired only when the flying device 20 is aerially moved at substantially the same height.

(S120: Select Template)

Back to the description of FIG. 3, when the template selecting screen 420 is displayed in step S110, the user selects one template object from the template objects 50a, 50b, and 50c displayed in the template display area 422 (S120). When it is detected that the template object is selected based on the input information of the input unit 110, the control unit 120 allows the template preparing unit 140 to display the selected template on the 3D map as the subject information and further present the details of the flight route information to the user. Consequently, as shown in FIG. 7, for example, the flight route adjusting screen 430 is displayed, indicating the flight route of the selected template on the 3D map.

Specifically speaking, when one template object is selected, the template preparing unit 140 allows a moving path of the flying device 200 shown by the template object to correspond to the 3D map imitating the real world. The template preparing unit 140 allows a position of the template object set on the 3D map to correspond to position information (latitude, longitude, and height) in the real world associated with the each position on the 3D map, and generates absolute flight route information that the flying device 200 is moved in the real world. With the association, it is determined through which latitude, which longitude, and which height the flying device 200 is moved in the real world. That is, the template preparing unit 140 allows information indicating a relative moving path of the flying device as the flight route information of the flying device 200 to correspond to an absolute flight range on the 3D map or a flight range defined by a physical absolute position, thereby generating the absolute flight route information of the flying device 200 in the real world.

Herein, the flight range can be defined with coordinates in certain space defined with absolute positions. Further, the information included in the flight range may be information that can define the absolute position. For example, it is possible to use a reference point of the absolute position used for determining the absolute position of the flying device as information for defining the flight range. In this case, the template preparing unit 140 may convert the relative flight route information shown by the template with reference to a reference point of the absolute position to generate the absolute flight route information of the flying device 200 in the real world.

(S130: Finely Adjust Flight Route Information)

On the flight route adjusting screen 430, the flight route information is changed for fine adjustment (S130). FIG. 7 shows an example of the flight route adjusting screen 430 that displays the selected flight route of the template on the subject information. FIG. 7 shows a case of selecting the template object 50b on the template selecting screen 420.

The flight route adjusting screen 430 contains a flight route information adjusting area 431 that displays the subject information indicating the flight route and a specific information display area 432 indicating specific information of the flight route information.

The flight route information adjusting area 431 is an area for changing the flight route displayed on the subject information. An object (also referred to as a "flight route object") 60 of the flight route of the template object 50b selected with a drag operation or a touch operation by the user in step S120 is displayed on the subject information. In the flight route information adjusting area 431, the flight route object 60 can be finely adjusted so as to be a route desired by the user.

For example, the user moves the flight route object 60 displayed in the flight route information adjusting area 431, for example, with the drag operation to arrange and adjust the flight route object 60 so as to match the 3D map as the subject information. Further, with a pinch-out operation for separating two fingers from a contact state or a pinch-in operation for allowing the two separated fingers to be close to each other on the flight route object 60, the flight route may be enlarged or reduced while keeping a basic flight route. For example, when enlarging a circular flight route set to a periphery of a structure A on the sea surface in the flight route object 60, the pinch-out operation may be performed within a circle of the circular flight route. Moreover, when a higher aerial position of the two circular flight routes is desired to be lower, for example, the pinch-in operation may be performed so that the circular flight routes are close to each other.

Furthermore, as shown in FIG. 7, a plurality of adjusting points 62a to 62i may be displayed on the flight route object 60 displayed in the flight route information adjusting area 431. The adjusting points 62a to 62i are operational positions for changing the flight route information, and are arbitrarily set, for example, at positions as points on the flight route.

For example, by moving the adjusting points 62a to 62i, the shape of the flight route object 60 can be changed. Specifically, it is assumed that the user touches the adjusting point 62f with the finger or the like, for example, in the flight route information adjusting area 431 in FIG. 7 and the adjusting point 62f is moved to the central direction of the circular flight route. With the movement of the adjusting point 62f, the flight route object 60 is changed to a flight route shown by a broken line. The flight route between the adjusting points is automatically interpolated and is corrected so as to be a natural movement. When the flight route in the flight route information adjusting area 431 is thus changed, the absolute flight route information of the flying device 200 in the real world is correspondingly changed.

Further, when the finger or the like touches the adjusting points 62a to 62i, for example, the camera angle of the imaging device 22 at the positions may be adjusted. For example, as shown in FIG. 8, it is assumed that the user allows the finger or the like to touch the adjusting point 62b. A camera angle object 64 indicating the camera angle is displayed at the position of the adjusting point 62b. The camera angle object 64 shown in FIG. 8 is an arrow, and the direction of the arrow indicates an imaging direction of the imaging device 22. The user moves or rotates the camera angle object 64 with the finger or the like, thereby easily changing the camera angle of the imaging device 22.

Furthermore, as shown in FIG. 8, images at the adjusting points 62a to 62i acquired by the imaging device 22 may be previewable. For example, it is assumed that the adjusting point 62f in FIG. 8 is selected with the finger or the like. At this time, a preview area 432a is provided in the flight route information adjusting area 431, and an image that is predicted to be captured from the position is displayed in the preview area 432a. The image displayed in the preview area 432a can be predicted with an imaging position acquired from the 3D map of the subject information and the flight route information, camera angle, zoom setting, and the like. The preview image is displayed in the preview area 432a, thereby making it possible to check in advance whether or not an image desired by the user is acquired with the set flight route information.

Further, when a preview image is displayed in the preview area 432a, the zoom setting unit 432b that enlarges or reduces the preview image may be provided. The zoom setting unit 432b is, e.g., a slide bar, and enlarges the preview image when the bar is moved to the positive side, and reduces the preview image when the bar is moved to the negative side. With this arrangement, it is also possible to adjust the zoom setting of the imaging device 22 at an adjusting point with the zoom setting unit 432b while checking the preview image. In addition to the adjustment of the camera angle and zoom, it is also similarly possible to perform setting of a camera mode that switches between high-speed photography and low-speed photography, or the like.

Note that, as shown in FIG. 7 and FIG. 8, the adjusting points 62a to 62i may be displayed on the flight route object 60. However, the present disclosure is not limited to the example, and the adjusting points 62a to 62i may not be displayed. When the adjusting points 62a to 62i are not displayed, it is possible to change the flight route object 60, display the camera angle object 64, and change the camera angle when the finger or the like touches an arbitrary position on the flight route object 60.

As mentioned above, the user can intuitively change the flight route information so as to match the subject information in the flight route information adjusting area 431 on the flight route adjusting screen 430.

On the other hand, in the specific information display area 432 on the flight route adjusting screen 430, the specific information of the flight route information displayed in the flight route information adjusting area 431 is displayed. For example, as shown in FIG. 7, there is displayed a total flight time 433 of the set flight route, and flight speed 434, height 435 or the like of the flying device 20 at one position, in the specific information display area 432. A selecting template 436 that is currently selected may be displayed. The user can change the flight route of the flying device 20 with reference to the information.

The specific information display area 432 has an "Edit-Course" button 437 that sets whether or not the flight route information displayed in the flight route information adjusting area 431 can be changed. Each time the "EditCourse" button 437 is pressed, it is changed whether or not the flight route information can be changed. In this case, when the flight route information is in a changeable state, "Editing" may be displayed in the flight route information adjusting area 431, for example, and be notified to the user.

Further, an "REC START" button 438 is provided in the specific information display area 432 to start photography by flying the flying device 20 based on the set flight route information. The "REC START" button 438 is operable when the flight route information cannot be changed by the "EditCourse" button 437.

As mentioned above, in step S130, the user can change the flight route information so as to acquire desired photographic data by operating the flight route object 60 displayed in the specific information display area 432 on the flight route adjusting screen 430.

(S140: Determine Flight Route Information)

After the adjustment of the flight route information in step S130 is finished, the flight route information is determined (S140). The flight route information may be determined, for example, when the "REC START" button 438 is pressed. The final flight route information of the flying device 200 generated by the flight route information generating processing according to the present embodiment may be indicated for all flight routes by absolute position information in the real world. Alternatively, in the flight route, only one or a plurality of points may be indicated by the absolute position information, and another point may be displayed with a relative position from the point indicated by the absolute position information. When the flight route information is determined, the control unit 120 sends the flight route information to the flying device 20. The flying device 20 that receives the flight route information carries out photography with the designated photographic setting along the set flight route.

Note that, the photographic data acquired by the flying device 20 based on the generated flight route information may be sent to the information processing terminal 10 in real time so that the user may check the photographic data. Alternatively, the imaging data may be stored in the photographic data storage unit 260 in the flying device 20 and the imaging data may be acquired from the photographic data storage unit 260 after the photography with flight is finished.

Further, the photographic data acquired by the flying device 20 may be associated with the flight route information when the photographic data is acquired as well as a video image. When the flight route setting unit 140 generates the flight route information, for example, it may be simultaneously performed to set whether the photographic data may be only the video image or the video image associated with the flight route information. By acquiring the photographic data associating the video image with the flight route information, it is possible to check a movement (e.g., horizontal movement, circling, rising, and falling) of the flying device 20 when editing the video image of the photographic data. Thus, it is possible to easily adjust the time axis, insert sound, or the like.

As mentioned above, the description is given of the flight route information generating processing in the imaging system according to the present embodiment. With the flight route information generating processing according to the present embodiment, the user selects the photographic scene, thereby selecting the template of the presented flight route information. Further, the user arranges the object indicating the flight route of the template, matching the subject information containing the 3D map. With such a simple operation, the photography can be performed by flying the flying device 20. Further, the flight route information can be finely adjusted with an intuitive operation such as the drag operation, pinch-in operation, or pinch-out operation.

2. SECOND EMBODIMENT

Figure 9:
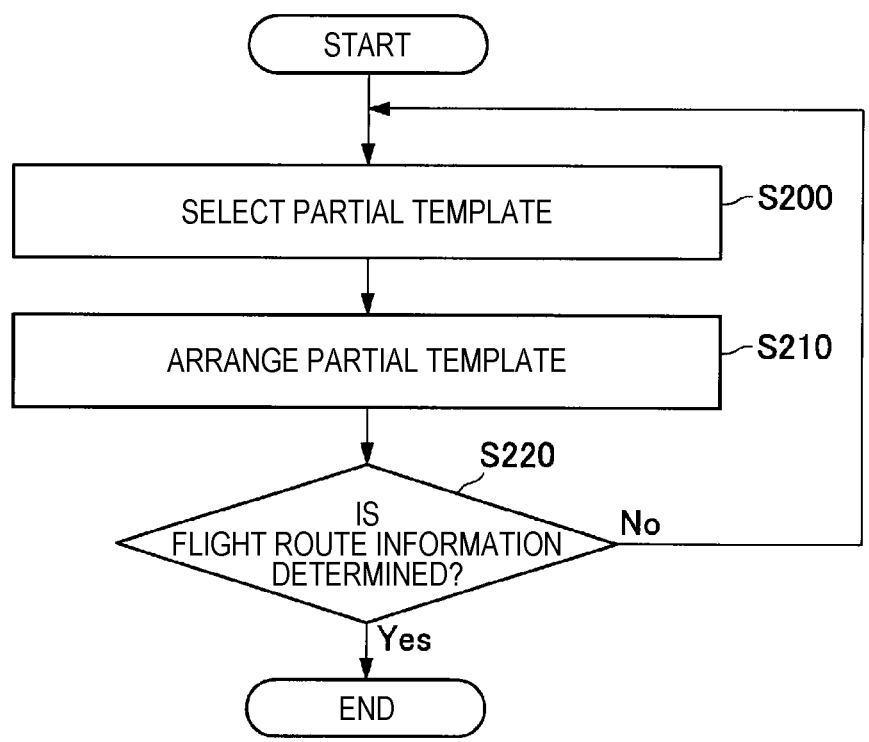
FIG. 9 is a flowchart illustrating flight route information generating processing at a manual setting time according a second embodiment of the present disclosure.
Figure 10:
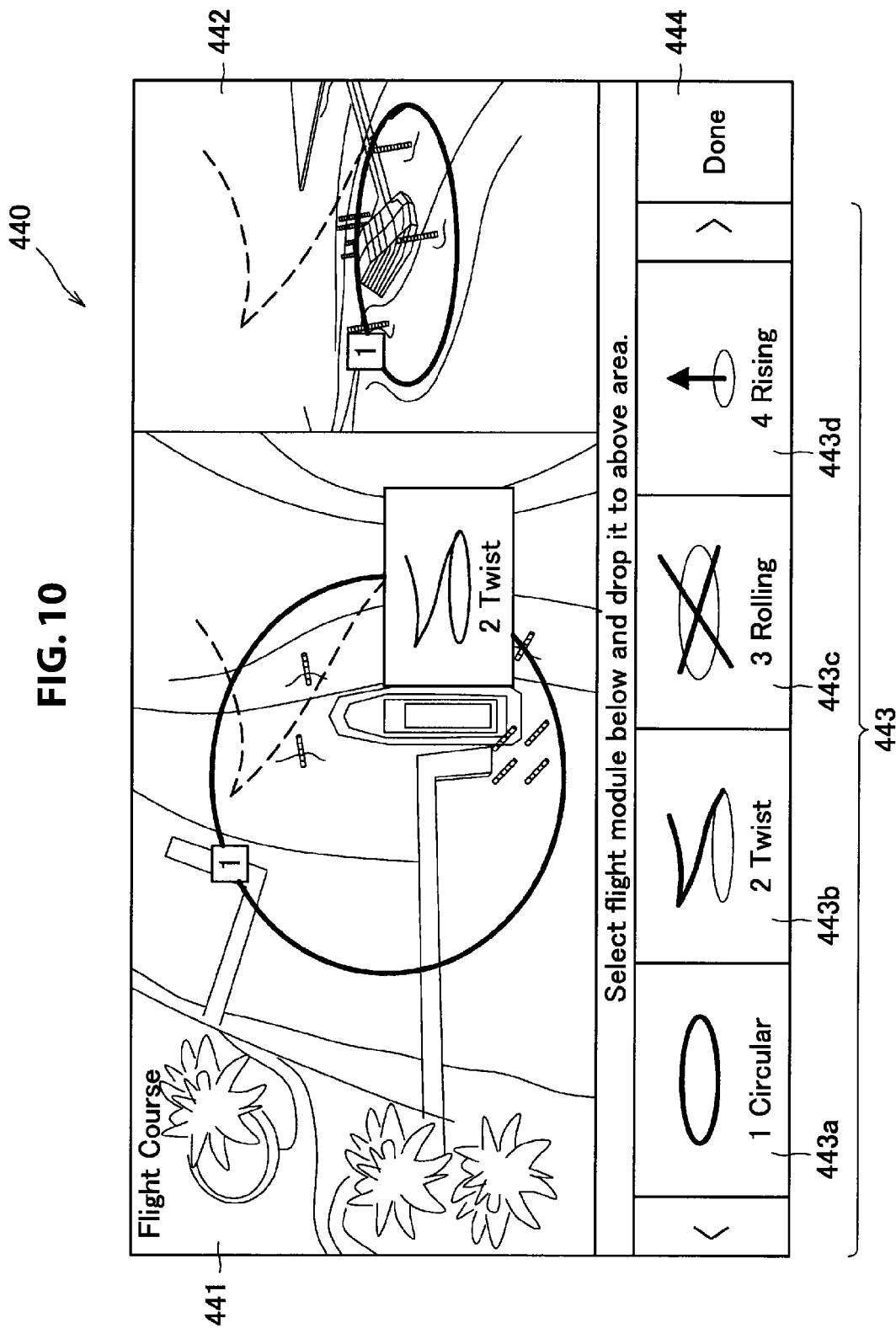
FIG. 10 is an explanatory diagram illustrating an example of a flight route information preparing screen at the manual setting time according to the embodiment.

Next, a description is given of flight route information generating processing according to a second embodiment. The flight route information generating processing according to the present embodiment is executed by the imaging system with the configuration shown in FIG. 2, similarly to the first embodiment, and is flight route information generating processing at a manual setting time for generating the flight route information by the user. Hereinafter, a description will be given of the flight route information generating processing according to the present embodiment with reference to FIG. 9 and FIG. 10. FIG. 9 is a flowchart showing the flight route information generating processing at the manual setting time according to the embodiment. Note that, FIG. 10 is an explanatory diagram showing an example of a flight route information preparing screen 440 at the manual setting time. Further, the imaging system according to the present embodiment is similar to that according to the first embodiment, and a description thereof is thus omitted here.

[2.1. Flight Route Information Generating Processing]

The flight route information generating processing according to the present embodiment in FIG. 9 is processing executed in place of steps S110 and S120 in the flight route information generating processing according to the first embodiment shown in FIG. 3. Therefore, upon receiving an instruction to prepare the flight route information from the user, the control unit 120 allows the display unit 160 to display the photographic scene selecting screen 410 for selecting the photographic scene for photography, and further allows the user to select the photographic scene. In this case, when the manual setting object 412*e* that enables manual setting of the flight route information is selected, the screen shifts to the flight route information preparing screen 440 as shown in FIG. 10.

The flight route information preparing screen 440 includes a flight route preparing area 441 that forms the flight route information, a check area 442 showing the flight route information formed at the time, a partial template display area 443, and a determining area 444. It is assumed that subject information (e.g., 3D map) displayed in the flight route preparing area 441 and the check area 442 is acquired before the shift to the flight route information preparing screen 440, similarly to the first embodiment. As mentioned below, the user arranges and combines partial templates indicating a basic flight route of the flying device 20 on the 3D map displayed in the flight route preparing area 441, thereby preparing the flight route information.

(S200: Select Partial Template)

First, the user selects the partial template indicating the basic flight route of the flying device 20 arranged to the 3D map of the flight route preparing area 441 from the partial template display area 443 (S200). The partial template displayed in the partial template display area 443 issues an instruction to acquire the partial template from the server 30 to the template acquiring unit 130 from the control unit 120 when the manual setting object 412*e* is selected on the photographic scene selecting screen 410. Note that, similarly to the template of the flight route information described in the first embodiment, the partial template also includes the flight route of the flying device 20 and the photographing setting information of the imaging device 22 during the flight along the flight route.

The template acquiring unit 130 outputs the partial template acquired from the server 30 to the display processing unit 150, and the display processing unit 150 allows the display unit 160 to display the partial template in the partial template display area 443. For example, as shown in FIG. 10, the partial template display area 443 displays partial templates such as a circular flight template 443*a*, a twist flight template 443*b*, a rolling flight template 443*c*, and a rising flight template 443*d*. If all the partial templates are not displayed in the partial template display area 443, the information in the partial template display area 443 may be scrolled, for example, by providing a left shift button ("<" button) or a right shift button (">" button). As a consequence, all the partial templates can be presented to the user.

The user allows the finger or the like to touch the partial template showing a desired basic flight route in the partial template display area 443, for example, thereby selecting the partial template.

(S210: Arrange Partial Template)

The partial template selected in step S200 is arranged on the flight route preparing area 441 (S210). For example, the user can arrange the partial template selected in the partial template display area 443 to the flight route preparing area 441 with the drag operation. Then, the user sets the partial template at an arbitrary position of the subject information displayed in the flight route preparing area 441. Note that, FIG. 10 shows a plan view of the 3D map in the aerial direction in the flight route preparing area 441. A display angle of the 3D map can be properly changed with an operation of the user.

Here, with the flight route generation unit 140, a partial-template number peculiar to each partial template may be added to the partial template arranged in the flight route preparing area 441. For example, in FIG. 10, a partial-template number "1" is displayed together to the circular flight template 443a arranged in the flight route preparing area 441. Thus, it is possible to easily understand which partial template the flight route information includes.

Further, as shown in FIG. 10, the already-arranged partial template is shown by a solid line, and the partial template in progress of the arrangement operation is shown by a broken line. That is, the display of the partial template may be changed depending on the arrangement state. As a consequence, the partial template in progress of the operation is easily recognized, and the user therefore easily prepares the flight route information.

When the partial template is arranged to the flight route preparing area 441, the flight route generation unit 140 also allows the check area 442 to display the already-arranged partial template in relation to the subject information of the flight route preparing area 441. In this case, the partial-template number may be displayed together with the partial template also in the check area 442. It is possible to properly change the display angle of the 3D map displayed in the check area 442 with an operation of the user. The check area 442 is provided so that the user checks which flight route information is generated. Therefore, the 3D map may be displayed at a display angle thereof to easily check the whole configuration of the flight route information.

(S220: Determine Flight Route Information)

When the partial template is arranged to the flight route preparing area 441, the user checks whether or not the desired flight route information is prepared (S220). When the current flight route information is in progress of preparation, the user repeats the processing in steps S200 and S210 until the desired flight route information is prepared. On the other hand, when it is determined that the desired flight route information is prepared, the user determines the flight route information by performing a selecting operation of the determining area 444.

As mentioned above, by presenting the partial template acquired by combining and modularizing the basic flight pattern such as the horizontal movement, rising, or circling and the photographing setting information such as the camera angle, the user can prepare the flight route information with an arbitrary combination. That is, it is possible to prepare the flight route information with an operation for arranging and combining the modules like a puzzle on the 3D map.

When the flight route information is prepared with the processing shown in FIG. 9, the screen shifts from the flight route information preparing screen 440 to the flight route information adjusting screen 430. Then, similarly to the first embodiment shown in FIG. 3, the flight route information is adjusted according to the necessity (S130), and the final flight route information is determined (S140).

As mentioned above, the description is given of the flight route information generating processing according to the second embodiment. With the flight route information generating processing according to the present embodiment, the user can easily prepare arbitrary flight route information by arranging the partial template to the subject information having the 3D map. As mentioned above, when the flight route information is manually prepared, the flight route information can be also prepared with a more simple operation by providing the partial module. Thus, elaborate photography can be carried out with high freedom.

3. CONCLUSION

With the imaging system according to the above-described embodiments, the flight route information optimized to the photographic scene or subject is provided as the template. Thus, it is possible to acquire photography advantageous effects such as a proper camera angle and framing in the photography with the flying device 20 whose operational control is difficult. The template of the presented flight route is arranged on the 3D map and a general operation such as the drag operation or pinch operation is performed, thereby finely adjusting the flight route. Therefore, the user can change the flight route information with an intuitive simple operation. Further, the camera angle is easily changed with the general operation such as the drag operation or pinch operation at an adjusting point that is arbitrarily set on the flight route object 60.

Further, not only the flight route information is provided as the template optimized to the photographic scene or subject, but also an arbitrary flight route can be prepared by the user with a combination of the modularized partial templates. As a consequence, elaborate photography can be performed with high freedom.

Further, the user can prepare the flight route information while corresponding to the 3D map. As a result, a flight range of the flying device 20 can be limited. The flying device 20 can be moved in wide space. Therefore, when the user operates the flight with a controller or the like, the flying device 20 may fly to an undesired range of the user or enter a forbidden zone. With the flight route information generating processing according to the above-described embodiments, the flight route or photography area of the flying device 20 is preset as the flight route information, thereby safely performing the photography with the flying device 20.

With such an imaging system, any person can easily realize the photography of a brilliant video image reflecting photographer's desire in the photography using the flying device. As a consequence, it is possible to easily photograph the video image that could not be photographed till now, and greatly widen user's usage or enjoyment of the flying device 20. Further, it is possible to widen a photographic scene such as a usual event or landscape as well as a typical use case such as a conventional school play, an athletic meeting, or travel, and such enjoyment can be expected that not a simple recorded video image but work with photographer's desire can be prepared.

4. EXEMPLARY HARDWARE CONFIGURATION

Figure 11:
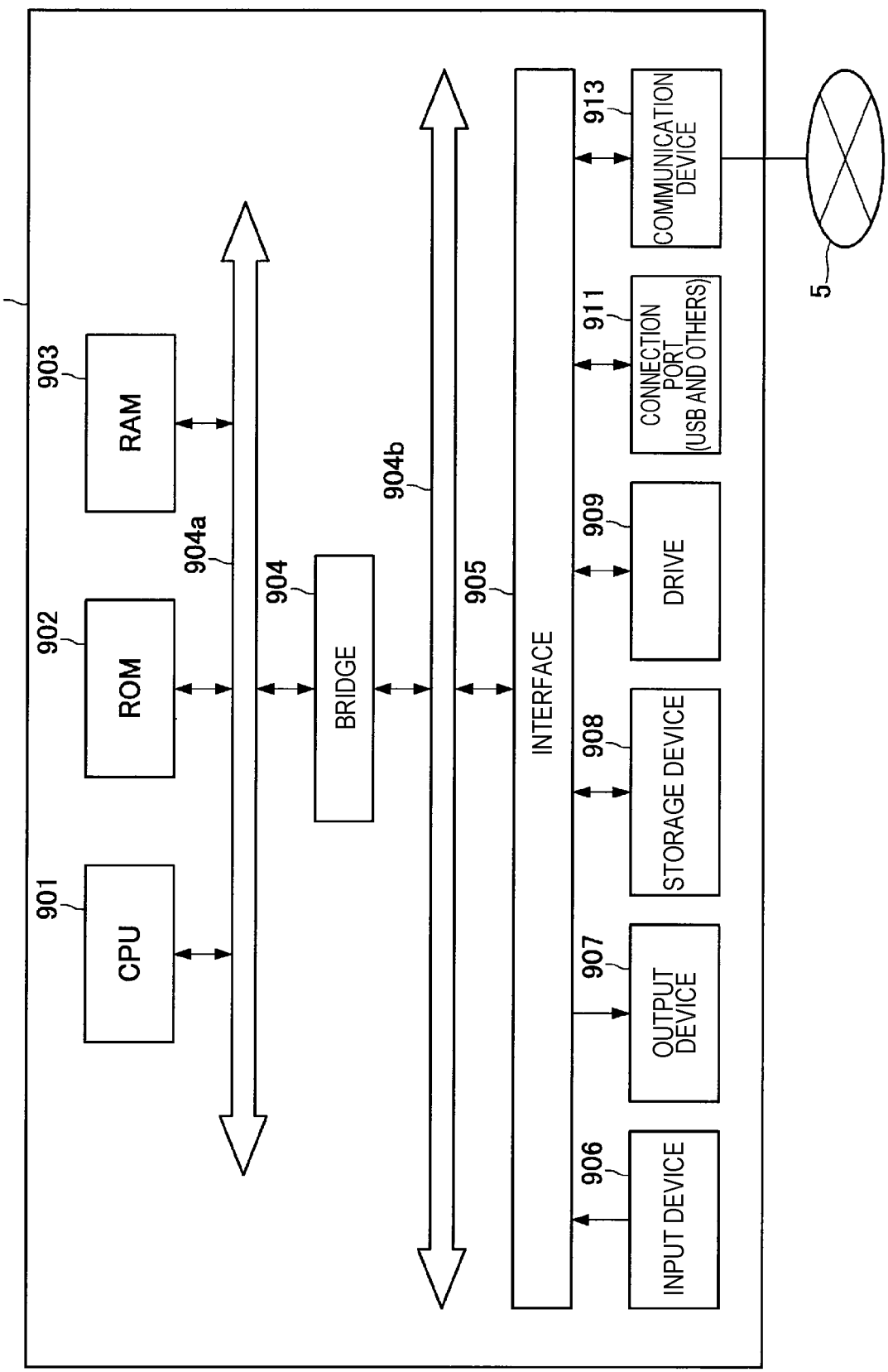
FIG. 11 is a hardware configuration diagram illustrating an exemplary hardware configuration of an information processing terminal according to the above-mentioned embodiment.

A process of the information processing terminal 10 in accordance with the embodiment can be executed either by hardware or software. For example, the information processing terminal 10 can be configured as shown in FIG. 11. Hereinafter, an exemplary hardware configuration of the information processing terminal 10 in accordance with the embodiment will be described with reference to FIG. 11.

The information processing terminal 10 in accordance with this embodiment can be realized by a processing device such as a computer as described above. The information processing terminal 10 includes, as shown in FIG. 11, a CPU (Central Processing Unit) 901, ROM (Read Only Memory) 902, RAM (Random Access Memory) 903, and a host bus 904a. The information processing terminal 10 also includes a bridge 904, an external bus 904b, an interface 905, an input device 906, an output device 907, a storage device 908, a drive 909, a connection port 911, and a communication device 913.

The CPU 901 functions as an arithmetic processing unit and a control unit, and controls the overall operation within the information processing terminal 10 in accordance with various programs. The CPU 901 may also be a microprocessor. The ROM 902 stores programs, operation parameters, and the like that are used by the CPU 901. The RAM 903 temporarily stores programs used in execution of the CPU 901, parameters that change as appropriate during the execution of the CPU 901, and the like. These components are mutually connected by the host bus 904a including a CPU bus or the like.

The host bus 904a is connected to the external bus 904b such as a PCI (Peripheral Component Interconnect/Interface) bus via the bridge 904. Note that the host bus 904a, the bridge 904, and the external bus 904b need not be provided separately, and the functions of such components may be integrated into a single bus.

The input device 906 includes input means for a user to input information, such as a mouse, keyboard, touch panel, button, microphone, switch, and lever; an input control circuit that generates an input signal in response to a user's input and outputs the signal to the CPU 901, and the like. Examples of the output device 907 include a display device such as a liquid crystal display (LCD) device, an OLED (Organic Light Emitting Diode) device, or a lamp; and an audio output device such as a speaker.

The storage device 908 is an exemplary storage unit of the information processing terminal 10. This is a device for storing data. The storage device 908 may include a memory medium, a recording device for recording data on the memory medium, a reading device for reading data from the memory medium, an erasing device for erasing data recorded on the memory medium, and the like. The storage device 908 stores programs and various data that drive the hard disk and are executed by the CPU 901.

The drive 909 is a reader/writer for a memory medium, and is incorporated in or externally attached to the information processing terminal 10. The drive 909 reads information recorded on a mounted removable recording medium such as a magnetic disk, an optical disc, a magneto-optical disk, or semiconductor memory, and outputs the information to the RAM 903.

The connection port 911 is an interface to be connected to an external device. This is a connection port to an external device that can transfer data via a USB (Universal Serial Bus), for example. The communication device 913 is a communication interface including a communication device or the like to be connected to a communications network 5. The communication device 913 may be any of a communication device supporting a wireless LAN (Local Area Network), a communication device supporting a wireless USB, and a wired communication device that performs wired communication.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that, according to the above-described embodiments, the flying device 20 includes the imaging device 22. However, the present disclosure is not limited to the example, and the flying device 20 may not necessarily include the imaging device 22. In this case, the flight route information may not include the photographing setting information. For example, when the flying device 20 performs aerial attraction, with the methods according to the embodiments, the flight route of the flying device 20 can be easily set, and the flying device 20 can be safely flied.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:
a flight route generation unit that
presents a template of flight route information showing a flight route of a flying object, and
generates flight route information of the flying object, associating the flight route information of the selected template with a flight range of the flying object, on the basis of an operation performed by a user.

(2)

The information processing device according to (1), wherein the flight route generation unit presents a template corresponding to a scene for flying the flying object.

(3)

The information processing device according to (1) or (2), wherein the flight route generation unit presents a template corresponding to a photographing mode of an imaging unit provided in the flying object.

(4)

The information processing device according to any one of (1) to (3), wherein the flight route information further includes photographing setting information of an imaging unit provided in the flying object.

(5)

The information processing device according to any one of (1) to (4), wherein the flight route generation unit
displays a flight route object showing a flight route of the template on map information showing a flight range of the flying object,
moves the flight route object on the map information, on the basis of an operation performed by the user, and
generates the flight route information of the flying object, on the basis of setting of the flight route object when the user performs a determining operation.

(6)

The information processing device according to (5), wherein the flight route generation unit generates the flight route information of the flying object, associating a position where the flight route object is arranged on the map information with position information in a real world associated with each position of the map information.

(7)

The information processing device according to (5) or (6), wherein the flight route generation unit allows a display unit to display a preview of a captured image acquired by an imaging unit provided in the flying object at an arbitrary position on the flight route object.

(8)

The information processing device according to any one of (5) to (7), wherein one or a plurality of adjusting points are provided on the displayed flight route, and the flight route generation unit changes the flight route information, on the basis of an operation performed by the user on the adjusting point.

(9)

The information processing device according to (8), wherein the flight route generation unit allows the adjusting point to display a camera angle object for displaying a camera angle of the imaging unit provided in the flying object, and changes the camera angle of the imaging unit in accordance with a change in a direction of the camera angle object by an operation performed by the user.

(10)

The information processing device according to (8) or (9), wherein the flight route generation unit changes the flight route information of the flying object in accordance with a movement of the adjusting point by an operation performed by the user.

(11)

The information processing device according to any one of (1) to (10), including:

a communication unit that performs information communication with at least the flying object, wherein the generated flight route information is sent to the flying object via the communication unit.

(12)

The information processing device according to (11), wherein the flight route generation unit allows the flying object to acquire photographic data in which photographic information that the flying object that has flown on the basis of the flight route information has photographed during flying with an imaging unit provided in the flying object and the flight route are associated with each other.

(13)

The information processing device according to any one of (1) to (12), including:

a template acquiring unit that is able to communicate with a server that holds a template including a flight route and acquires the template from the server.

(14)

An information processing method including:

presenting a template of flight route information showing a flight route of a flying object; and generating flight route information of the flying object, associating the flight route information of the selected template with a flight range of the flying object, on the basis of an operation performed by a user.

(15)

A program for causing a computer to execute processing including:

presenting a template of flight route information showing a flight route of a flying object; and generating flight route information of the flying object, associating the flight route information of the selected template with a flight range of the flying object, on the basis of an operation performed by a user.

(16)

An imaging system including:

a flying object; and an information processing terminal including a flight route generation unit that presents a template of flight route information showing a flight route of the flying object, and generates flight route information of the flying object, associating the flight route information of the selected template with a flight range of the flying object, on the basis of an operation performed by a user.

REFERENCE SIGNS LIST 10 information processing terminal
20 flying device
30 server
110 input unit
120 control unit
130 template acquiring unit
140 flight route generation unit
150 display processing unit
160 display unit
170 communication unit (side of information processing terminal)
210 communication unit (side of flying device)
220 flight control unit
230 flying mechanism
232 motor
234 propeller
240 photography control unit
250 imaging unit
260 photographic data storage unit
310 template storage unit

The invention claimed is:

1. An information processing device comprising:
processing circuitry configured to
control presentation of flight route template information showing different options resulting in different flight routes of a flying object,
receive a selection of an option corresponding to the flight route template information,
generate flight route information for the flying object based on the selected option, and
provide instructions for flight to the flying object based on the generated flight route information,
wherein the flight route template information includes three dimensional position information of the flying object or movement path data represented as a vector component.

2. The information processing device according to claim 1, wherein the different options include different scenes for flying the flying object.

3. The information processing device according to claim 1, wherein the flight route template information includes a photographing setting corresponding to a photographing mode of a camera provided in the flying object.

4. The information processing device according to claim 3, wherein the photographing setting includes at least one of photography start, photography end camera angle, framing, frame rate, and zoom setting.

5. The information processing device according to claim 1, wherein the flight route information further includes photographing setting information of a camera provided in the flying object.

6. The information processing device according to claim 1, wherein the processing circuitry is further configured to control display of a flight route object corresponding to a flight route of the fling object for the selected option on a map, move the flight route object on the map based on an operation performed by the user thereby setting the flight route object, and generate the flight route information for the flying object based on the setting of the flight route object by the operation of the user.

7. The information processing device according to claim 6, wherein processing circuitry is further configured to generate the flight route information of the flying object by associating a position where the flight route object is arranged on the map with position information in a real world corresponding to the position on the map.

8. The information processing device according to claim 6, wherein the processing circuitry is further configured to control display of a preview of a captured image acquired by a camera provided in the flying object at an arbitrary position on the flight route object.

9. The information processing device according to claim 6, wherein one or a plurality of adjusting points are provided on a displayed flight route, and the processing circuitry is configured to change the flight route information based on an operation performed by the user to an adjusting point.

10. The information processing device according to claim 9, wherein the adjusting point is displayable with a camera angle indication corresponding to a camera angle of the camera provided in the flying object, changes the camera angle of the camera changes in accordance with a change in a direction of the camera angle indication by an operation performed by the user.

11. The information processing device according to claim 9, wherein the processing circuitry changes the flight route information for the flying object in accordance with a movement of the adjusting point by an operation performed by the user.

12. The information processing device according to claim 1, further comprising:

a transceiver that performs information communication with at least the flying object, wherein the processing circuitry sends the instructions for flight to the flying object via the transceiver.

13. The information processing device according to claim 12, wherein the processing circuitry is configured to associate photographic information, obtained during flying a flight route corresponding to the flight route information with a camera provided in the flying object, with the flight route.

14. The information processing device according to claim 1, wherein the processing circuitry is further configured to communicate with a server that holds the flight route template information and acquires the flight route template information from the server.

15. The information processing device according to claim 1, wherein the flight route template information includes information defining a type of flight from a group comprising: circular flight, twist flight, rolling flight and rising flight.

16. The information processing device according to claim 15, wherein the processing circuitry is further configured to control presentation of the flight route template information by patterning the different flight routes based on the type of flight from the group comprising: circular flight, twist flight, rolling flight and rising flight.

17. An information processing method comprising:

controlling presentation of flight route template information showing different options resulting in different flight routes of a flying object;

receiving a selection of an option corresponding to the flight route template information;

generating flight route information for the flying object based on the selected option; and providing instructions for flight to the flying object based on the generated flight route information, wherein the flight route template information includes three dimensional position information of the flying object or movement path data represented as a vector component.

18. The information processing method according to claim 17, wherein the different options include different scenes for flying the flying object.

19. The information processing method according to claim 17, wherein the flight route template information includes a photographing setting corresponding to a photographing mode of a camera provided in the flying object.

20. The information processing method according to claim 17, wherein the flight route information further includes photographing setting information of a camera provided in the flying object.

21. The information processing method according to claim 17, further comprising:

controlling display of a flight route object corresponding to a flight route of the flying object for the selected option on a map, moving the flight route object on the map based on an operation performed by the user thereby setting the flight route object, and generating the flight route information for the flying object based on the setting of the flight route object by the operation of the user.

22. The information processing method according to claim 21, further comprising:

generating flight route information of the flying object by associating a position where the flight route object is arranged on the map with position information in a real world corresponding to the position on the map.

23. The information processing method according to claim 21, further comprising: controlling display of a preview of a captured image acquired by a camera provided in the flying object at an arbitrary position on the flight route object.

24. The information processing method according to claim 21, wherein one or a plurality of adjusting points are provided on a displayed flight route, and wherein the method further comprises changing the flight route information based on an operation performed by the user to an adjusting point.

25. The information processing method according to claim 24, wherein the adjusting point is displayable with a camera angle indication corresponding to a camera angle of the camera provided in the flying object, changes the camera angle of the camera changes in accordance with a change in a direction of the camera angle indication by an operation performed by the user.

26. The information processing method according to claim 24, further comprising: changing the flight route information for the flying object in accordance with a movement of the adjusting point by an operation performed by the user.

27. The information processing method according to claim 17, further comprising:

performing information communication, using a transceiver, with at least the flying object, the communication including sending the instructions for flight to the flying object via the transceiver.

28. The information processing method according to claim 27, further comprising: associating photographic information, obtained during flying a flight route corresponding to the flight route information with a camera provided in the flying object, with the flight route.

29. The information processing method according to claim 17, further comprising communicating with a server that holds the flight route template information and acquires the flight route template information from the server.

30. The information processing method according to claim 17, wherein the flight route template information includes information defining a type of flight from a group comprising: circular flight, twist flight, rolling flight and rising flight.

31. The information processing method according to claim 30, further comprising: controlling presentation of the flight route template information by patterning the different flight routes based on the type of flight from the group comprising: circular flight, twist flight, rolling flight and rising flight.

32. A non-transitory computer readable medium storing thereon a program that when executed by a computer causes the computer to execute processing comprising:

controlling presentation of flight route template information showing different options resulting in different flight routes of a flying object;

receiving a selection of an option corresponding to the flight route template information;

generating flight route information for the flying object based on the selected option; and providing instructions for flight to the flying object based on the generated flight route information, wherein the flight route template information includes three dimensional position information of the flying object or movement path data represented as a vector component.

33. An imaging system comprising:

a flying object; and an information processing terminal including processing circuitry configured to control presentation of flight route template information showing different options resulting in different flight routes of a flying object, receive a selection of an option corresponding to the flight route template information, generate flight route information for the flying object based on the selected option, and provide instructions for flight to the flying object based on the generated flight route information, wherein the flight route template information includes three dimensional position information of the flying object or movement path data represented as a vector component.

* * * * *